United States Patent
Bickelman et al.

(10) Patent No.: US 9,423,804 B2
(45) Date of Patent: *Aug. 23, 2016

(54) CONTROL OF SOLID STATE MEMORY DEVICE TEMPERATURE USING QUEUE DEPTH MANAGEMENT

(71) Applicant: International Business Machines Corporation, Armonk, NY (US)

(72) Inventors: Craig A. Bickelman, Weatherly, PA (US); Edward W. Chencinski, Poughkeepsie, NY (US); Seth R. Greenspan, Pleasant Valley, NY (US); M. Dean Sciacca, Poughkeepsie, NY (US); Xiaojin Wei, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,765

(22) Filed: Mar. 8, 2016

(65) Prior Publication Data

US 2016/0170421 A1     Jun. 16, 2016

Related U.S. Application Data

(63) Continuation of application No. 14/207,862, filed on Mar. 13, 2014.

(51) Int. Cl.
*G05D 23/13* (2006.01)

(52) U.S. Cl.
CPC ................. *G05D 23/1393* (2013.01)

(58) Field of Classification Search
None
See application file for complete search history.

(56) References Cited

U.S. PATENT DOCUMENTS

| 7,886,172 B2 * | 2/2011 | Bose ............ G06F 1/206 |
| | | 713/300 |
| 7,930,470 B2 | 4/2011 | Brittain et al. |
| 2013/0305008 A1 | 11/2013 | Kwon et al. |

* cited by examiner

*Primary Examiner* — Kim Huynh
*Assistant Examiner* — Paul J Yen
(74) *Attorney, Agent, or Firm* — Cantor Colburn LLP; Steven Chiu

(57) ABSTRACT

Embodiments relate to controlling a temperature of a solid state memory device using queue depth management by monitoring an operating temperature of each of a plurality of solid state drives of the solid state memory device. Based on a determination that the operating temperature of one of the plurality of solid state drives exceeds local device threshold values, the method includes receiving an indication that one or more local measures have been taken by the solid state memory device. Based on a determination that the operating temperature of one of the plurality of solid state drives exceeds a secondary global threshold value, the method includes reducing a queue length for the solid state memory device.

1 Claim, 3 Drawing Sheets

CONTROL OF SOLID STATE MEMORY DEVICE TEMPERATURE USING QUEUE DEPTH MANAGEMENT

DOMESTIC PRIORITY

This application is a continuation of the legally related U.S. application Ser. No. 14/207,862 filed Mar. 13, 2014, which is fully incorporated herein by reference.

BACKGROUND

The present invention relates generally to solid state memory devices, and more specifically, to controlling the temperatures of solid state memory devices using queue depth management.

In general, solid state memory devices, such as flash drives, require substantial power to operate and create cooling challenges. In particular, solid state memory devices consume a large amount of power when continuously writing high volumes of data. Many available solid state memory devices include built-in throttling capabilities that are used to control the power consumption of the solid state memory devices. In some cases, the throttling slows down the local clock of the solid state memory devices to reduce the power consumption of the solid state memory devices.

As the use of solid state memory devices continues to increase, the cooling challenges presented will make it increasingly difficult to keep the solid state memory devices functioning at acceptable levels of performance. For example, as the density of solid state memory devices in a system increases or as the cooling environment in which the solid state memory devices operate become more constrained the chances of solid state memory devices continuing to function at required performance levels decreases.

SUMMARY

Embodiments include methods for controlling a temperature of solid state memory devices using queue depth management by monitoring an operating temperature of each of a plurality of solid state drives of the solid state memory device. Based on a determination that the operating temperature of one of the plurality of solid state drives exceeds local device threshold values, the method includes receiving an indication that one or more local measures have been taken by the solid state memory device. Based on a determination that the operating temperature of one of the plurality of solid state drives exceeds a secondary global threshold value, the method includes reducing a queue length for the solid state memory device.

Embodiments also include a computer program product for controlling a temperature of solid state memory devices using queue depth management, the computer program product including a tangible storage medium readable by a processing circuit and storing instructions for execution by the processing circuit for performing a method. The method includes monitoring an operating temperature of each of a plurality of solid state drives of the solid state memory device. Based on a determination that the operating temperature of one of the plurality of solid state drives exceeds local device threshold values, the method includes receiving an indication that one or more local measures have been taken by the solid state memory device. Based on a determination that the operating temperature of one of the plurality of solid state drives exceeds a secondary global threshold value, the method includes reducing a queue length for the solid state memory device.

Embodiments further include a computer system having a solid state memory device including a plurality of solid state drives and a host configured to store data on the solid state memory device. The solid state memory device includes a controller configured to perform a method including monitoring an operating temperature of each of the plurality of solid state drives of the solid state memory device. Based on a determination that the operating temperature of one of the plurality of solid state drives exceeds local device threshold values, the method includes receiving an indication that one or more local measures have been taken by the solid state memory device. Based on a determination that the operating temperature of one of the plurality of solid state drives exceeds a secondary global threshold value, the method includes reducing a queue length for the solid state memory device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In exemplary embodiments, methods and systems for controlling a temperature of solid state memory devices using queue depth management are provided. In exemplary embodiments, the operating temperatures of solid state memory devices are monitored and if the temperatures rise above a first threshold level the solid state memory device is subject to local measures within the device such as cycle time throttling. In cases where the local measures taken do not sufficiently limit the power draw and temperatures rise above a second threshold value, the queue length for each solid state drive of the solid state memory device is reduced. This queue length reduction will limit the rate of traffic that reaches the each solid state drive that is affected by the over-temperature condition. In exemplary embodiments, when the temperature on the solid state drives drops below a third threshold value, which is lower than the first threshold level, the queue depth is restored to its original length to restore full traffic flow.

Figure 1:
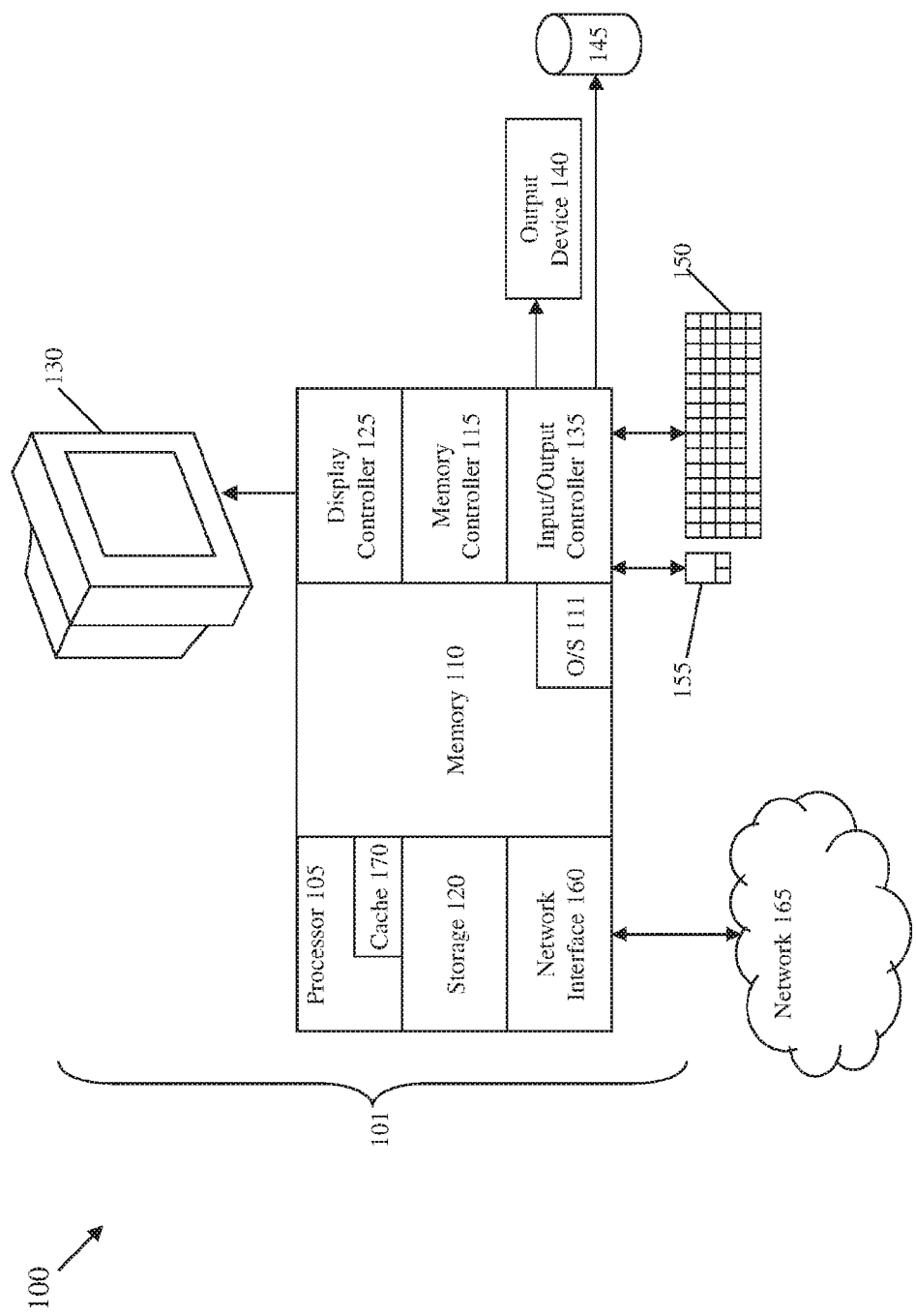
FIG. 1 depicts a block diagram of a computing system in accordance with an exemplary embodiment.

FIG. 1 illustrates a block diagram of an exemplary computer system 100 for use with the teachings herein. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDD), solid state drives (SSD), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

Figure 2:
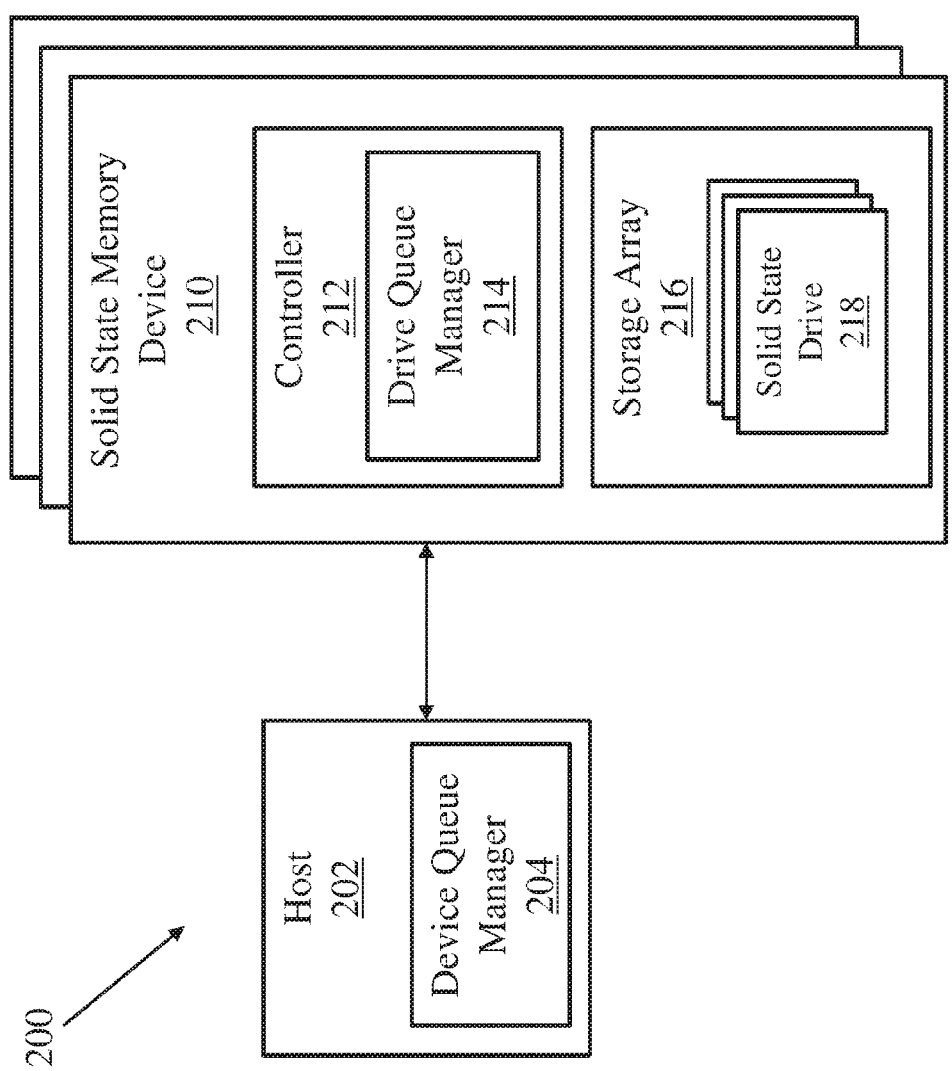
FIG. 2 depicts a block diagram of computing system having a solid state memory device in accordance with an exemplary embodiment.

Referring now to FIG. 2, a block diagram of a computing system 200 including a solid state memory device 210 in accordance with an exemplary embodiment is shown. As illustrated, the system 200 includes a host 202 that is in communication with a plurality of solid state memory devices 210. In exemplary embodiments, each of the solid state memory devices 210 includes a controller 212, which controls the operation of the storage array 216 of the solid state memory device 210. The storage array 216 includes a plurality of solid state memory drives 218, such a flash memory drives. In exemplary embodiments, the controller 212 may be a processor that is configured to utilize a RAID system across the plurality of solid state memory drives 218 for purposes of data redundancy and performance improvement.

In exemplary embodiments, the host 202 is configured to select data to be written to the solid state memory devices 210 and to read data from the solid state memory devices 210. In exemplary embodiments, the host 202 includes a device queue manager 204 that manages a queue of write instructions for the plurality of solid state memory devices 210. For example, the device queue manager 204 of the host 202 may be configured to evenly distribute write instructions amongst the solid state memory devices 210 to prevent uneven wearing of the solid state memory devices 210. In exemplary embodiments, the device queue manage 204 of the host 202 may be configured to increase or decrease the workload for a given solid state memory device 210 based on the operating conditions of the solid state memory device 210. For example, if one of the solid state memory devices 210 is determined to be above a desired operating temperature, the device queue manager 204 may reduce the size of a write instruction queue for that solid state memory device 210, which will effectively reduce the workload of the solid state memory devices 210.

In exemplary embodiments, the controller 212 includes a drive queue manager 214 that manages a queue for each solid state drive 218 of the storage array 216. The drive queue manager 214 of the controller 212 may be configured to evenly distribute write instructions amongst the solid state drives 218 of the storage array 216 to prevent uneven wearing of the solid state drives 218. In exemplary embodiments, the drive queue manager 214 is configured to increase or decrease a queue length of the queues for all of the solid state drives 218 based on the operating conditions of one of the solid state drive 218. For example, if one of the solid state drives 218 is determined to be above a desired operating temperature, the drive queue manager 214 may reduce the size of a write instruction queue for all of the solid state drives 218.

In exemplary embodiments, the controller 212 is configured to store volatile state information of the solid state memory device 210 and may include dynamic random access memory (DRAM) for storing the volatile state information. The volatile state information may include, but is not limited to, cache write information of the solid state memory device 210, latch state information of the solid state memory device 210, temperature data of the solid state memory device 210, or the like. In exemplary embodiments, the storage array 216 includes non-volatile state information of the solid state memory device 210, which may include, but is not limited to, program-erase (P/E) cycle counts, bit error rate data, logical to physical mappings, bad block data, and other metadata.

The controller 212 of a solid state memory device 210 is configured to continuously monitor the temperature of each of the solid state drives 218. In exemplary embodiments, the controller 212 may share the monitored temperature information, or a portion thereof, with the host 202 and may also receive ambient temperature information from the host 202. In exemplary embodiments, the controller 212 may be configured to store the monitored temperature information and the ambient temperature information and to responsively adjust the operating conditions of solid state memory device 210 based on the stored temperature information.

Figure 3:
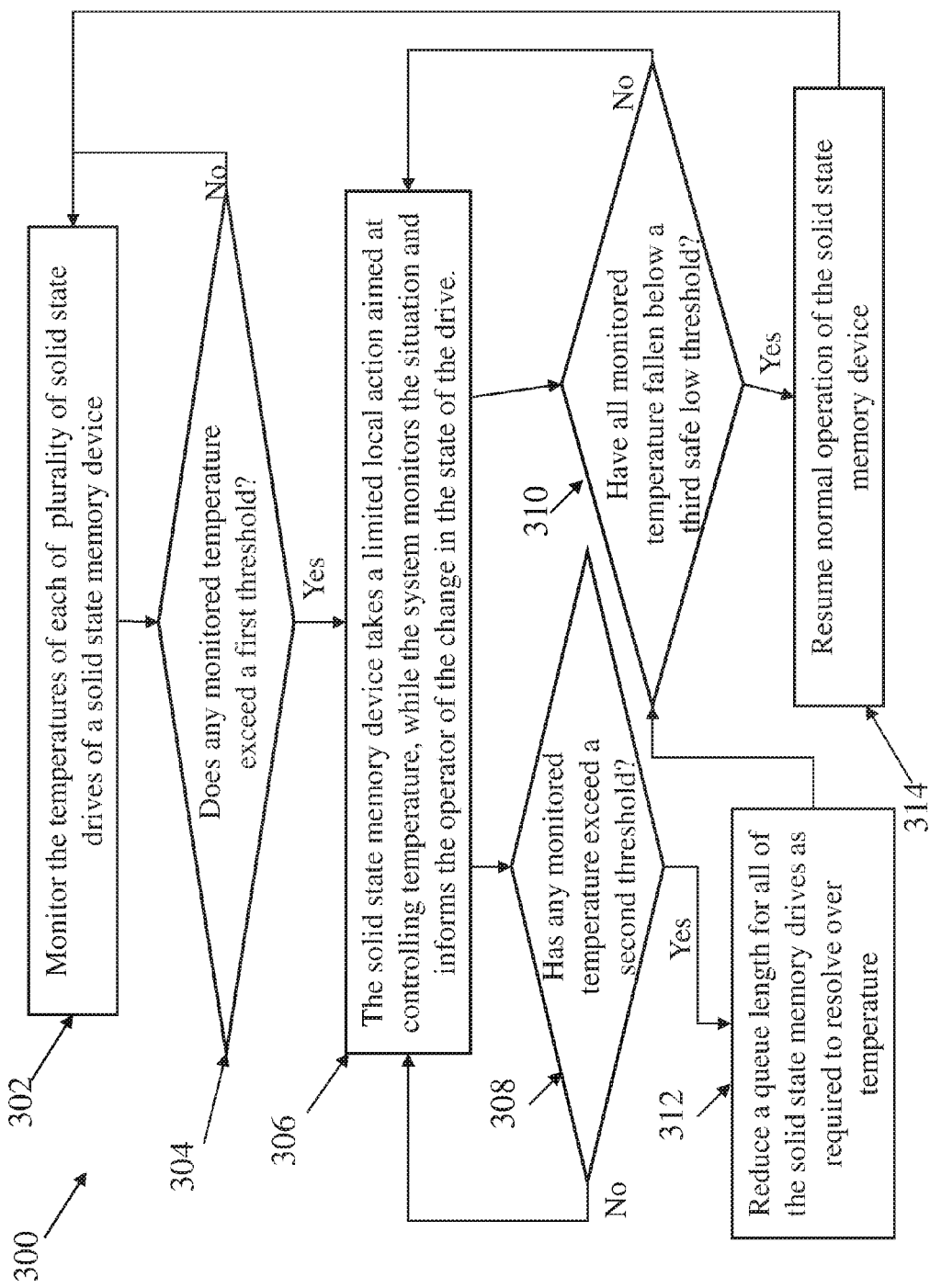
FIG. 3 is a block diagram illustrating a method for controlling a temperature of solid state memory devices using queue depth management in accordance with an exemplary embodiment.

Referring now to FIG. 3 a block diagram illustrating a method 300 for controlling a temperature of solid state memory devices using queue depth management in accordance with an exemplary embodiment is shown. As shown at block 302, the method 300 includes monitoring the temperatures of each of plurality of solid state drives of a solid state memory device. Next, as shown at decision block 304, the method 300 includes determining if any of the monitored temperatures exceeding a first threshold. If any of the monitored temperatures exceeds the first threshold, the method 300 proceeds to block 306 where local measures are taken such as operating the solid state memory device with an increased cycle time and decreased write capacity. In any event the global monitoring of the temperatures of each of plurality of solid state drives continues. In exemplary embodiments, operating the solid state memory device with local measures enacted reduces the workload, i.e., the number of data writes, of the solid state memory device, which should result in the heat being generated by the solid state memory device decreasing. However, operating the solid state memory device with local temperature reduction measures may not always be effective in reducing the operating temperatures of the solid state drives of a solid state memory device. This is particularly the case when the cooling system of the solid state memory device or the cooling system of the operating environment of the solid state memory device fails, either partially or completely.

As shown at decision block 308, the method 300 includes determining if any monitored temperature of the solid state drives exceeds a second threshold. In exemplary embodiments, the second threshold is higher than the first threshold and is less than a warranty limit temperature for the solid state drives. In many cases, solid state drives are warrantied by their manufacturer and the warranty is only valid as long as the operating temperature of the solid state device does not exceed a maximum temperature, which is referred to herein as the warranty limit temperature. If any of the monitored temperatures of the solid state drives exceeds the second threshold, the method 300 proceeds to block 310 and includes reducing a queue length for all of the solid state drives of the solid state memory device. In exemplary embodiments, by reducing the queue length for all of the solid state drives of the solid state memory device the workload, i.e., the number of data writes, of each of the solid state drives is reduced, which should result in the heat being generated by the solid state memory device decreasing. In general, method 300 includes multiple thresholds that can be incrementally and gradually adjusted to have varying effectiveness on the temperature control, allowing the trade-off of varying effects on the system performance. Depending on system load and the nature of the failure causing the over-temperature scenario, greater or lesser queue depth settings can be brought to bear on the problem over time to correct for the failure while minimizing impact on system performance.

In exemplary embodiments, upon determining that any monitored temperature of the solid state drives exceeds a second threshold, the solid state memory device may alert the host that the second threshold was exceeded. In exemplary embodiments, if the queue depths are substantially limited the flow of data traffic between the host and the solid state memory device will be severely disrupted, which could cause issues such as timeouts and decreasing effectiveness of recovery. Accordingly, in response to receiving an alert from one of the solid state memory devices that second threshold was exceeded, the host may increase timeout settings for communication with the solid state memory device. In exemplary embodiments, the host may utilize a device queue manager on the host to reduce the workload on a solid state memory device that has exceeded the second threshold, if one or more of the other available solid state memory devices have not exceeded the second threshold. In yet another embodiment, the host may be configured to set an alert, or issue an instruction, to increase the operation of a cooling system, if present. For example, the host may control one or more blowers that are used to cool the solid state memory devices and upon receiving an alert from one of the solid state memory devices that second threshold was exceeded, the host may responsively increase the speed of a blower in the area of the solid state memory device.

Continuing with reference to FIG. 3, if none of the monitored temperatures exceed the second threshold, the method 300 returns to block 306 and continues operating the solid state memory device with local measures taken such as an increased cycle time and decreased write capacity. As shown at decision block 312, the method 300 includes determining if all of the monitored temperatures have fallen below a third threshold, which is lower than the first threshold. If all monitored temperatures have fallen below this third threshold, then the method 300 proceeds to block 314 and resumes normal operation of the solid state memory devices.

In exemplary embodiments, the system may include numerous additional threshold temperatures which are higher than the second threshold temperatures and upon any of the monitored temperatures of the solid state drives exceed these additional threshold temperatures, then the queue length for all of the solid state drives of the solid state memory device can be further reduced.

In exemplary embodiments, the amount that the queue length of the solid state drives is reduced may be based on a number of factors including, but not limited to, the ambient temperature of the environment of the solid state memory device and the temperature of the solid state drives over time. For example, if the ambient temperature of the environment that the solid state memory device is in has been steadily increasing over time, then the amount that the queue length is reduced may be larger than if the ambient temperature of the environment has been stable over time. In this case an increase in the ambient temperature of the environment that the solid state memory device is in may be indicative of a failure of a cooling system for the environment that the solid state memory device is in. In another example, as the rate of the temperature increase of either the ambient temperature of the environment or of the solid state drive increases, the amount that the queue length is reduced is increased.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for controlling a temperature of a solid state memory device using queue depth management, the method comprising:

monitoring, by a processor, an operating temperature of each of a plurality of solid state drives of the solid state memory device;

based on determining that the operating temperature of one of the plurality of solid state drives exceeds a first threshold value, receiving an indication that one or more local measures have been taken by the solid state memory device;

based on determining that the operating temperature of one of the plurality of solid state drives exceeds a second threshold value, reducing a queue length of the solid state memory device, wherein an amount of the reduction of the queue length is based on a rate of change of an ambient temperature of an environment of the solid state memory device;

based on determining that the operating temperature of all of the plurality of solid state drives are below a third threshold value, resuming normal operations of the solid state memory device, wherein the threshold value is less than the first threshold value and wherein the second threshold value is less than a warranty limit temperature; and based on determining that the operating temperature of one of the plurality of solid state drives exceeds the second threshold value, generating an alert that the second threshold value was exceeded.

\* \* \* \* \*